(12) United States Patent
Handa (10) Patent No.: US 8,264,337 B2
(45) Date of Patent: Sep. 11, 2012

(54) PRESSURE TANK AND DETECTION METHOD OF PRESSURE TANK INTERNAL ABNORMALITY

(75) Inventor: Kiyoshi Handa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 396 days.

(21) Appl. No.: 12/497,028

(22) Filed: Sep. 15, 2009

(65) Prior Publication Data

US 2010/0001851 A1 Jan. 7, 2010

(30) Foreign Application Priority Data

Jul. 4, 2008 (JP) ................................ 2008-176252

(51) Int. Cl.
*B60Q 1/00* (2006.01)
(52) U.S. Cl. ........................................................ 340/438
(58) Field of Classification Search .................. 340/438, 340/514, 611, 621, 626; 73/37, 40
See application file for complete search history.

(56) References Cited

U.S. PATENT DOCUMENTS

| | | | | |
|---|---|---|---|---|
| 4,708,015 | A | * | 11/1987 | Sharp ............................... 73/49.2 |
| 4,893,287 | A | * | 1/1990 | Stratton et al. ................... 367/91 |
| 5,036,707 | A | * | 8/1991 | Paciej et al. ....................... 73/637 |
| 6,597,973 | B1 | * | 7/2003 | Barich et al. ....................... 701/29 |
| 2004/0118210 | A1 | * | 6/2004 | Tooma et al. ..................... 73/625 |

FOREIGN PATENT DOCUMENTS

| | | |
|---|---|---|
| JP | 02-102450 A | 4/1990 |
| JP | 7-77477 A | 3/1995 |
| JP | 07-260751 A | 10/1995 |
| JP | 8-54330 A | 2/1996 |
| JP | 10-030797 A | 2/1998 |
| JP | 2005-153586 A | 6/2005 |
| JP | 2007-44716 A | 2/2007 |
| JP | 2007-531868 A | 11/2007 |
| WO | 2005-010522 A2 | 2/2005 |
| WO | 2009/008515 A1 | 1/2009 |

OTHER PUBLICATIONS

Japanese Office Action mailed May 8, 2012, issued in corresponding Japanese Patent Application 2008-176252, with English translation.
Hatsukade, Yoshimi et al., "Nondestructive testing of CFRP-covered aluminum liner for storage of hydrogen fuel using HTS SQUID", Summary for Lecture of Cryogenics and Superconductivity Society of Japan, Nov. 20, 2006, p. 164, with partial English translation; cited in Japanese Office Action mailed May 8, 2012.

* cited by examiner

*Primary Examiner* — Phung Nguyen
(74) *Attorney, Agent, or Firm* — Westerman, Hattori, Daniels & Adrian, LLP (57) ABSTRACT

A pressure tank including, a tank wall; a supporting member which includes fiber reinforced plastic and supports an outer surface of the tank wall; a supersonic wave sensor which is connected to the tank wall, and which detects a sonic wave propagated in the tank wall; and an internal abnormality determination member which is connected to the supersonic wave sensor, and which determines whether an internal abnormality exits in the tank wall, wherein the internal abnormality determination member determines the existence of the internal abnormality based on the detection result during gas is charged into the pressure tank, and outputs an abnormality signal when the internal abnormality was determined to exist.

11 Claims, 6 Drawing Sheets

PRESSURE TANK AND DETECTION METHOD OF PRESSURE TANK INTERNAL ABNORMALITY

BACKGROUND OF THE INVENTION

1. Field of the Invention

The present invention relates to a pressure tank and a detection method of a pressure tank internal abnormality.

Priority is claimed on Japanese Patent Application No. 2008-176252, filed Jul. 4, 2008, the content of which is incorporated herein by reference.

2. Description of Related Art

In the recent years, a certain kind of pressure tanks for charging gas at a high pressure have been used in some instances, the pressure tank including a kind of container so-called a liner (tank wall) made with aluminum or resin, and the liner being reinforced at the outer surface with Fiber Reinforced Plastic (FRP). FRP is a composite material including plastic and glass or carbon fibers. This kind of pressure tanks possesses advantages of their light weight and high durability against pressure at the same time.

On the other hand, in the application of the aforementioned pressure tanks, there is a concern in that when the tank suffered a damage from some external force, the FRP may be damaged or detached from the liner outer surface, causing an abrupt decrease of the FRP durability. As a result, a concern emerges that the liner reinforced by the liner also cracks.

When the liner cracks, the stress on the liner would be concentrated at the cracked part, resulting in a deformation and progression of the crack. As a result, the pressure-durability of the liner decreases, and the gas charged in the liner may leak. As mentioned above, since the liner is covered by the FRP, the crack in the liner can not be found by visual examination. Therefore, such crack may not be found until the gas actually leaks.

In view of the aforementioned circumstances, as a detection method of pressure tank crack which does not depend on a visual examination, the following constitutions are known.

For example, in the constitution disclosed in the Japanese Unexamined Patent Application, First Publication H2-102450, a supersonic wave probe emits a supersonic wave from the outside of the container, and performs a scan. Thus obtained defects signals based on the reflected echo and the position signal from the position detector are used to compose a section image along the scanning line, or a defect image along the scanning plane.

As another example, the constitution disclosed in Japanese Unexamined Patent Application, First Publication H10-30797, includes a FRP reinforce layer provided at the outside of a liner. The reinforce layer includes a detection circuit having a signal wire. When this signal wire is broken by a damage caused on the FRP reinforce layer, the change in the signal transfer in the detection circuit is used to detect whether the reinforce layer is in a sound condition.

In the recent years, there are cases where the aforementioned pressure tanks are equipped on fuel cell vehicles as a fuel tank. In this case, when the pressure tank is damaged by an accident or the like, the liner may crack, and the gas in the liner may leak.

However, in the constitution of the Japanese Unexamined Patent Application, First Publication H2-102450, since the supersonic wave probe performs a scan while the reflected echo is detected at the same time, it had been impossible to detect abnormalities during a continuous use of the vehicle. Accordingly, in order to detect cracks on the pressure tank, the pressure tank needs to be unloaded from the vehicle, resulting in high man-hours and costs, and there was a problem in that the overall process was inefficient.

In the constitution of the Japanese Unexamined Patent Application, First Publication H10-30797, the detection circuit included in the reinforce layer is used to detect the abnormality of the reinforce layer. Accordingly, cracks deep inside of the liner, which is provided inside of the reinforce layer, could not be detected. Furthermore, in order to detect smaller cracks, it had been necessary to provide the signal wires at a high density, resulting in an increase in the cost. Although it had been possible to detect cracks by the break of the signal wire, in cases where the signal wire does not break, e.g., when an abnormality happened in the reinforce layer while the reinforce layer was detached from the liner, the abnormality could not be detected.

The present invention was made in view of the aforementioned circumstances: an object of the present invention is to provide a pressure tank in which an internal abnormality can be detected, and to provide a method of pressure tank internal abnormality detection, in which the detection can be performed during a continuous use of the vehicle, while the man-hors and costs are reduced, and the maintenance efficiencies are improved, and while the internal abnormality such as cracks can be reliably and quickly detected.

SUMMARY OF THE INVENTION

In order to address the abovementioned object, aspects of the present invention provides the followings:

(1) A pressure tank including, a tank wall; a supporting member which includes fiber reinforced plastic and supports an outer surface of the tank wall; a supersonic wave sensor which is connected to the tank wall, and which detects a sonic wave propagated in the tank wall; and an internal abnormality determination member which is connected to the supersonic wave sensor, and which determines whether an internal abnormality exits in the tank wall, wherein the internal abnormality determination member determines the existence of the internal abnormality based on the detection result during gas is charged into the pressure tank, and outputs an abnormality signal when the internal abnormality was determined to exist.

(2) The pressure tank of above (1) may be constituted as follows: the supersonic wave sensor includes a pressure sensor which detects an internal pressure of the pressure tank; and a storage member which stores the relationship information between the internal pressure of the pressure tank in a status having no internal abnormality, and a sonic wave shape propagated in the tank wall at the internal pressure, wherein: the internal abnormality determination member performs a noise cancellation, by comparing the sonic wave shape stored in the storage member corresponding to the internal pressure detected by the pressure sensor, and the sonic wave shape detected by the supersonic wave sensor; and the internal abnormality determination member determines whether an internal abnormality exists, based on the sonic wave shape after the noise cancellation.

(3) The pressure tank of above (1) may be constituted as follows: the pressure tank is loaded on a fuel cell vehicle in the interior thereof, and supplies gas fuel to fuel cells of the fuel cell vehicle.

(4) The pressure tank of above (3) may be constituted as follows: the abnormality signal is outputted to a fuel charge station and cause the fuel charge station to holt a fuel charge operation.

(5) The pressure tank of above (3) may further include a notification member which notifies an occurrence of the internal abnormality to an operator, when the internal abnormality of the tank wall is determined by the internal abnormality determination member.

(6) Another aspect of the present invention provides the followings: a pressure tank including: a tank wall provided with a supporting member including fiber reinforced plastic at a outer surface of the tank wall; a supersonic wave probe provided on the tank wall, which emits a sonic wave into the tank wall, and receives a reflection sonic wave of the emitted sonic wave; and an internal abnormality determination member which determines the status of an internal abnormality in the tank wall, based on the reflection sonic wave received by the supersonic wave probe, wherein: the internal abnormality determination member performs a noise cancellation, by comparing the reflection sonic wave received by the supersonic wave probe, and a sonic wave stored in advance in a status where no internal abnormality exists; and the internal abnormality determination member determines a status of the internal abnormality, based on a status of the reflection sonic wave after the noise cancellation.

(7) The pressure tank of above (6) may be constituted as follows: the pressure tank is loaded on a fuel cell vehicle in the interior thereof, and supplies gas fuel to fuel cells of the fuel cell vehicle; the internal abnormality determination member determines a status of the internal abnormality in a period from a turn-on of an ignition of the fuel cell vehicle until a start of the fuel cell vehicle; when the internal abnormality determination member determined that there is no internal abnormality, the internal abnormality determination member allows the start of the fuel cell vehicle; and when the internal abnormality determination member determined that there is an internal abnormality, the internal abnormality determination member notifies an operator of the fuel cell vehicle with the occurrence of the internal abnormality.

(8) The pressure tank of above (6) may be constituted as follows: a first head plate which is provided at a first end along an axial direction of the pressure tank, and which has a mouth piece at a center part of the first head plate; and a second head plate which is provided at a second end along an axial direction of the pressure tank, and which has a supersonic wave probe at a center part of the second head plate.

(9) Another aspect of the present invention provides the followings: an internal abnormality detection method of a pressure tank, the pressure tank having a tank wall and a supporting member at an outer surface of the tank wall, the supporting member including fiber reinforced plastic, the method including: a sonic wave detection process which detects a sonic wave that propagates in the tank wall accompanied with an internal pressure rise in the tank wall; an internal abnormality determination process which determines whether an internal abnormality of the tank wall exists or not; and an abnormality signal output process, in which, when the internal abnormality determination process determined that an internal abnormality exists in the tank wall, an abnormality signal is outputted, wherein: the internal abnormality determination process includes a noise cancellation process, which performs a noise cancellation by comparing a sonic wave status detected in the sonic wave detection process and a sonic wave status propagated in the tank wall in a state in which no internal abnormality exists in the tank wall; and the internal abnormality determination process uses the sonic wave status after the noise cancellation, in order to determine the internal abnormality in the tank wall.

(10) Another aspect of the present invention provides the followings: an internal abnormality detection method of a pressure tank, the pressure tank having a tank wall and a supporting member at an outer surface of the tank wall, the supporting member including fiber reinforced plastic, the method including: a sonic wave emission process which emits a sonic wave into the tank wall; an echo reception process which receives a reflection sonic wave of the sonic wave emitted in the sonic wave emission process; an internal abnormality determination process which determines the status of an internal abnormality of the tank wall; and an abnormality signal output process, in which, when the internal abnormality determination process determined that an internal abnormality exists in the tank wall, an abnormality signal is outputted, wherein: the internal abnormality determination process includes a noise cancellation process, which performs a noise cancellation by comparing the reflection sonic wave detected in the echo reception process and a sonic wave propagated in the tank wall in a state in which no internal abnormality exists in the tank wall; and the internal abnormality determination process uses the sonic wave status after the noise cancellation, in order to determine the internal abnormality in the tank wall.

(11) The pressure tank of above (10) may be performed as follows: the internal abnormality determination process determines a status of the internal abnormality in a period from a turn-on of an ignition of the fuel cell vehicle until a start of the fuel cell vehicle; when the internal abnormality determination process determined that there is no internal abnormality, the internal abnormality determination process allows the start of the fuel cell vehicle; and when the internal abnormality determination process determined that there is an internal abnormality, the internal abnormality determination process notifies an operator of the fuel cell vehicle with the occurrence of the internal abnormality.

According to the inventions of aforementioned (1) and (9), when the gas is charged in the tank wall, the internal gas pressure rises, and this pressure rise cause an outward stress on the inside surface of the tank wall, in the direction expanding the tank wall.

At this time, if an internal abnormality exists in the tank wall such as a crack, the pressure rise in the tank wall causes a stress concentration at the position of internal abnormality. This stress causes a deformation or a progression of the internal abnormality. Along with the deformation and the progression of the internal abnormality, a large elastic wave (known as crack noise) is produced from the position of the internal abnormality. By detecting this crack noise with a supersonic wave sensor, existence or inexistence of internal abnormality at the tank wall can be reliably and quickly determined. Accordingly, an internal abnormality of the tank wall covered by the reinforce layer can be determined without depending on a visual examination. If an internal abnormality existed in the tank wall, by outputting an abnormality signal a gas charging process can be limited before a progression of the internal abnormality such that it cause a gas leak from the tank wall.

Since the inventions of aforementioned (2) includes the storage member which stores the relationship information between the internal pressure of the tank wall in an normal state of the tank wall (in which there is no internal abnormality), and the wave that progresses in the tank wall. Accordingly, this stored wave in the storage member can be compared with the wave actually detected by the supersonic wave sensor. By this operation, a noise cancellation of the detected signal can be performed. Accordingly, if a certain amount of wave still existed even after the noise cancellation, it can be determined that an internal abnormality is occurring. Therefore, even a minor crack noise can be detected; and the internal abnormality of tank wall can be detected precisely and quickly.

According to the invention of aforementioned (3), by adopting the pressure tank of the present invention as a high pressure hydrogen tank equipped in a vehicle body of a fuel cell vehicle, the internal abnormality can be detected while the pressure tank is equipped in the vehicle body. Accordingly, unlike the conventional arts, there is no need to unload the pressure tank from the vehicle before performing an internal abnormality detection of the tank wall, resulting in an decrease in a man-hour for the maintenance and a cost thereof. Since the internal abnormality detection of the tank wall can be performed while the tank is equipped in the vehicle body, a quick detection can be performed before a deformation or a progression of the internal abnormality of tank wall, resulting in an improved safety.

According to the inventions of aforementioned (4), when an internal abnormality occurred in the tank wall, by outputting a fuel charging operation halt signal to a fuel charging station, the gas charging operation into the tank wall can be halted, resulting in a safe fuel charging operation.

According to the inventions of aforementioned (5), when an internal abnormality occurred in the tank wall, by reporting the occurrence of the internal abnormality to the operator, the operator can promptly notice the occurrence of the internal abnormality. Accordingly, the operator can take appropriate steps in order to avoid a gas leak from the tank wall.

According to the inventions of aforementioned (6) and (10), the supersonic wave emitted from the supersonic wave probe into the tank wall echoes back from inside of the tank wall. This return wave status is compared with a return wave status obtained in a normal tank status. Accordingly, if the return wave status contained an abnormality, it can be determined that the tank wall may have an internal abnormality. By using the return wave status obtained in a normal tank status, a noise canceling operation can be performed on the detected return wave status. In other words, if a certain amount of return wave still existed even after the noise cancellation, it can be determined that an internal abnormality is occurring. Accordingly, even a minor crack noise can be detected, resulting in a precise and quick detection of an internal abnormality of tank wall.

BRIEF DESCRIPTION OF THE DRAWINGS

Part (a), (b), and (c) of FIG. 6 are graphs showing the wave amplitudes at various time t. Part (a) shows a normal status; Part (b) shows a crack occurrence status; and Part (c) shows an amplitude caused by the crack.

DETAILED DESCRIPTION OF THE INVENTION

Embodiments of the present invention is explained hereinafter, with reference to figures. In the following embodiments, a case in which a pressure tank is equipped on a fuel cell vehicle is explained. In the following explanations, the directions such as front, rear, left, and right correspond to directions of the vehicle, if there is no particular description otherwise. In the figures, arrows FR shows vehicle forward direction; LH shows vehicle left direction; and UP shows vehicle upper direction.

First Embodiment

Fuel Cell Vehicle

Figure 1:
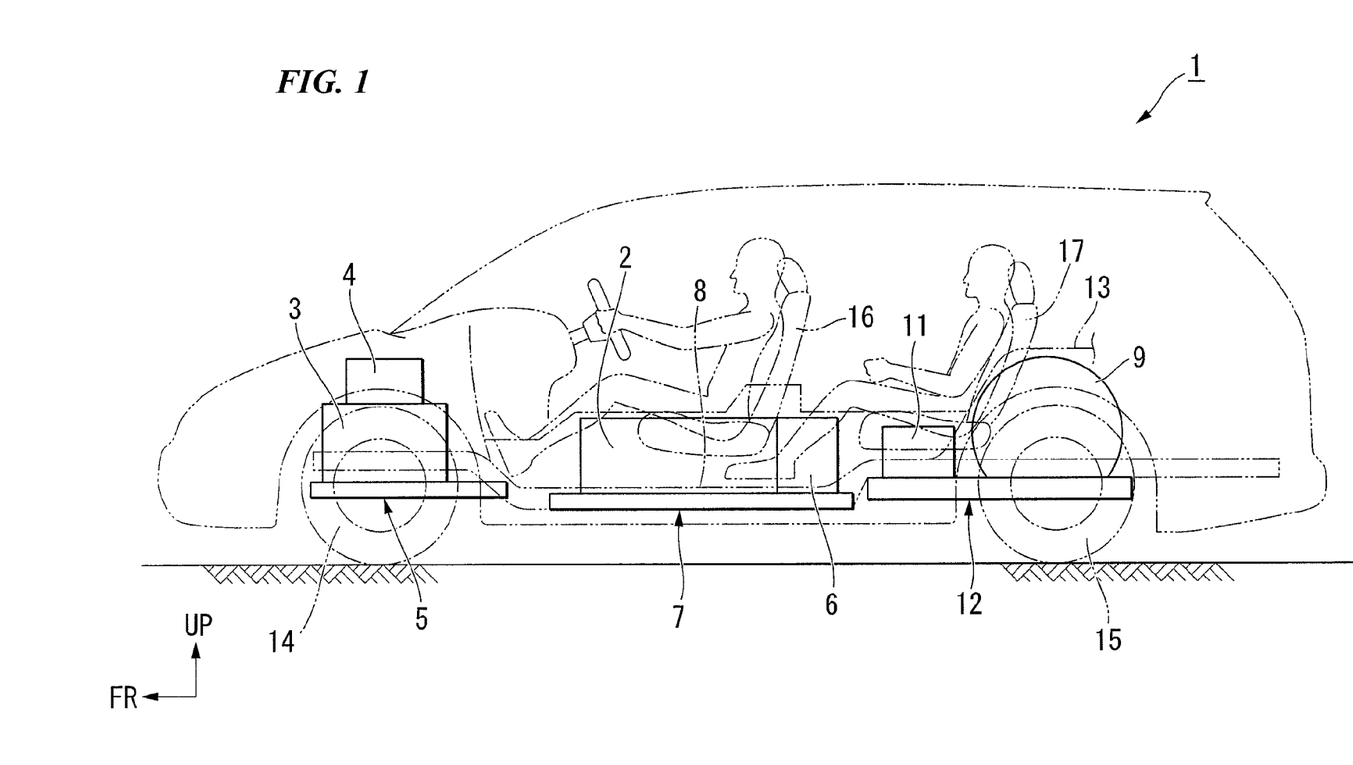
FIG. 1 is a schematic structural view (a side view) of the fuel cell vehicle according to an embodiment of the present invention.

FIG. 1 is a schematic structural view (a side view) of the fuel cell vehicle according to an embodiment of the present invention.

As shown in FIG. 1, the fuel cell vehicle 1 is equipped with a stack of fuel cells 2 (hereinafter denoted as fuel cells 2) under a floor of the vehicle. The fuel cells 2 generate electricity by an electrochemical reaction of hydrogen and oxygen and thereby drives a motor 3 with the generated electric power, and thereby runs the vehicle. The fuel cells 2 include a plurality of unit fuel cell (unit cell) stacked along, for example, the vehicle front-rear direction. At the anode side of the fuel cells 2, hydrogen gas is supplied as fuel gas. At the cathode side of the fuel cells 2, air including oxygen is supplied as oxidant gas. Thereby, an electrochemical reaction generates electric power and water.

Motor 3 is loaded on a front sub-frame 5 along with a compressor 4, and in that state, provided in a motor room at a front part of the vehicle. The fuel cells 2 and a supporting member 6 for the fuel cells 2 are loaded on a front sub-frame 7, and in that state, provided at a vehicle middle part in the front-rear direction, at a vehicle cabin exterior side of a floor panel 8. A fuel gas tank (pressure tank) 9, which stores hydrogen gas supplied to the anode side of the fuel cells 2, is loaded on a rear sub-frame 12 along with a battery 11 which stores regenerated electric power from the motor 3. The sub-frame 12 is provided at a vehicle rear part and at a vehicle cabin exterior side of a rear floor 13.

The supporting member 6 for the fuel cells 2 includes hydrogen supply members such as a regulator, or an ejector, and air ejection members such as a humidifier and a dilution box. The reference numbers 14 and 15 in FIG. 1 shows front and rear wheels; the reference numbers 16 and 17 shows front and rear sheets in the vehicle cabin.

(Fuel Gas Tank)

Figure 2:
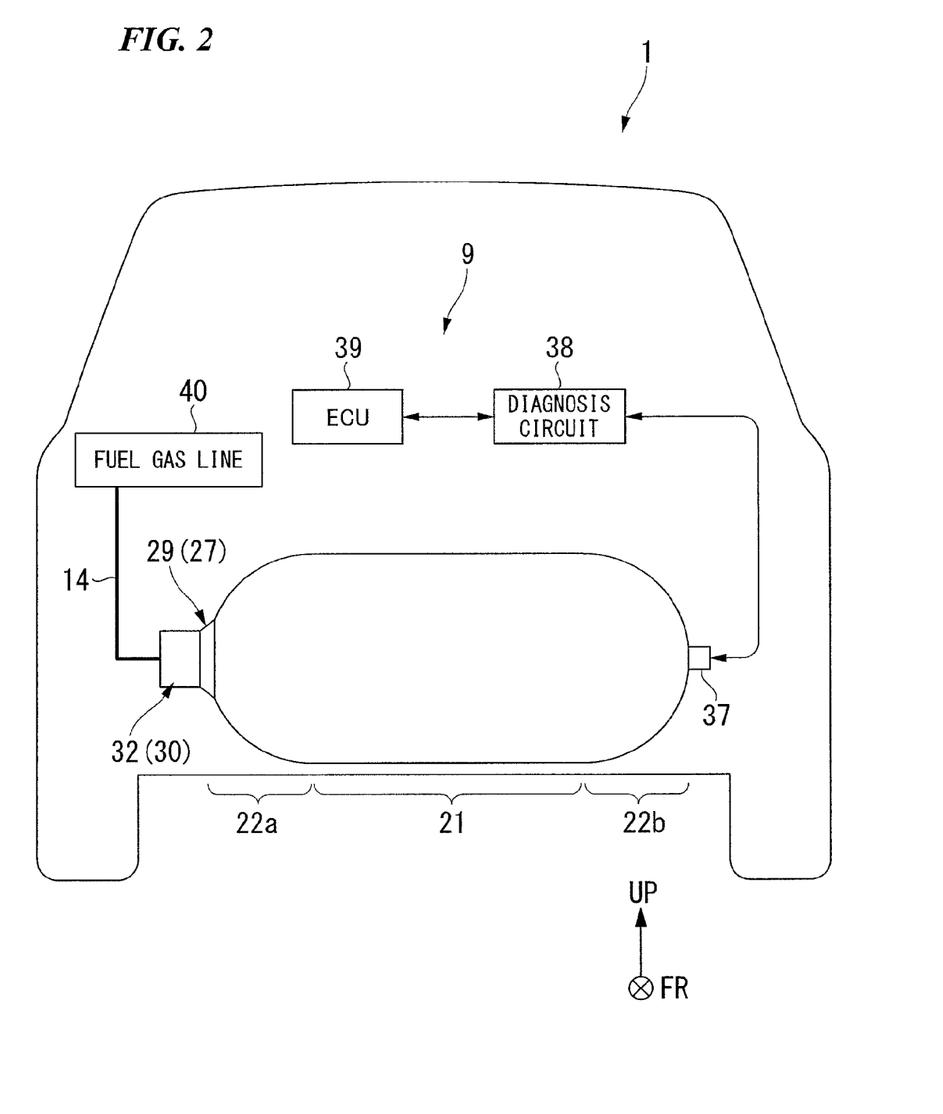
FIG. 2 is a schematic structural view (a rear view) of the fuel cell vehicle according to an embodiment of the present invention.

A fuel gas tank according to the present embodiment is explained hereinafter. FIG. 2 is a schematic structural view (a rear view) of the fuel cell vehicle, and FIG. 3 is a sectional view of the fuel gas tank.

Figure 3:
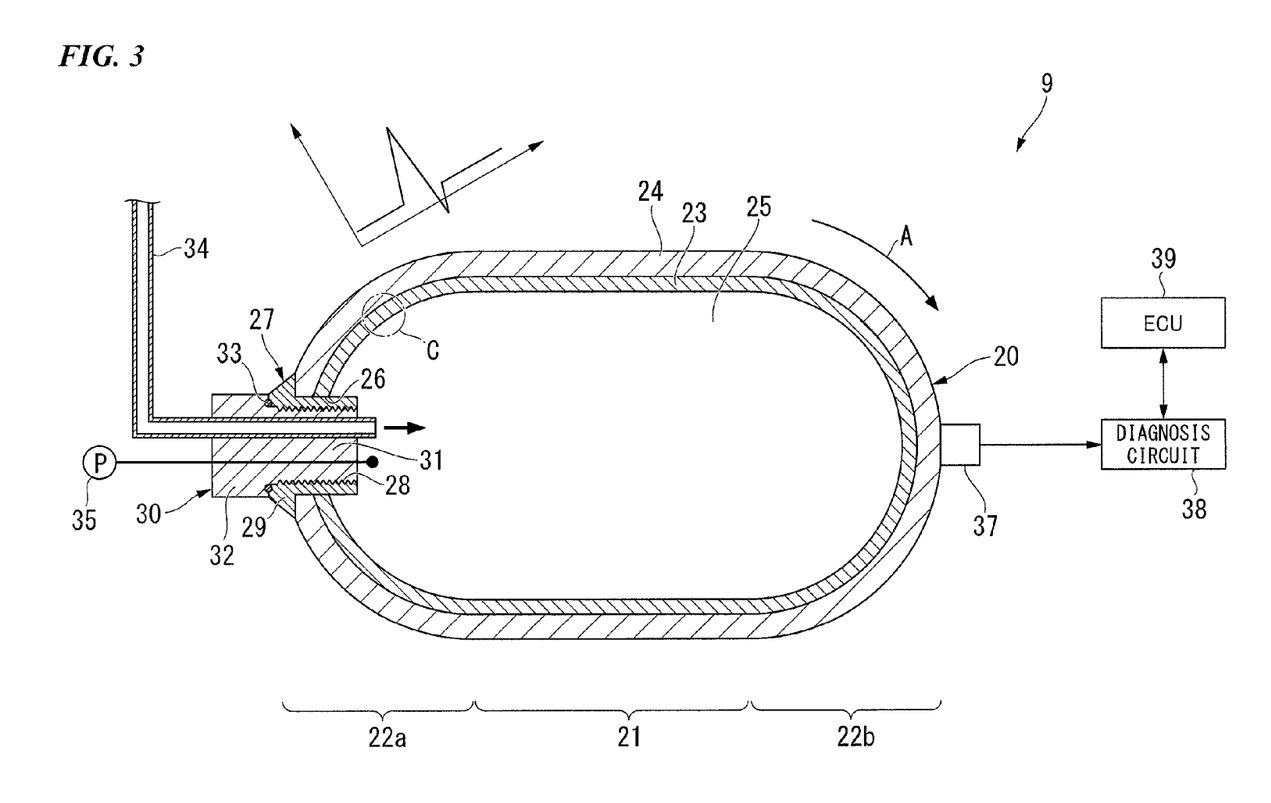
FIG. 3 is a sectional view of a fuel gas tank according a first embodiment of the present invention.

As shown in FIGS. 2 and 3, the fuel gas tank 9 is a high pressure hydrogen tank, having a charging pressure of 35 MPa, and equipped with a cylinder shaped tank body 20. The tank body 20 is provided with the longitudinal direction (axial direction) aligned with the vehicle width direction, and provided at a vehicle middle part in the front-rear direction, on the floor panel 8 on the outside of the vehicle cabin. The tank body 20 includes a cylinder part 21 provided at an axial direction middle part thereof, and a head plate part 22a and 22b, which seals both ends of the axial direction cylinder part 21.

The tank body 20 is provided with a liner 23, and a reinforce layer 24 which covers the liner 23.

The liner 23 is made with aluminum or resin material or the like, and has a cylinder shape. The inside space of the liner 23 is gas storage tank 25 which stores hydrogen gas.

The reinforce layer 24 is provided on the outside of the liner 23 so as to closely adhere thereto, and is made with fiber reinforced plastic, i.e., a composite material including plastic and glass, carbon, or the like. In such constitution, the liner 23 is reinforced with the reinforce layer 24, and has an advantageous effects of being light-weighted and has a high durability against pressure, as compared to a tank body made with metal.

A through hole 26 is formed at one end (on the left side in FIG. 3) of the axial-direction of the tank body 20, and at a center part (peak part) of the head plate part 22*a*, so as to penetrate the liner 23 and the reinforce layer 24. A cylinder-shaped metal mouth piece 27 is fixed at this through hole 26. The inside of the mouth piece 27 has a thread hole 28. One end of the thread hole 28 opens toward the exterior of the tank body 20, and the other end opens toward the interior of the gas storage tank 25. At one end of the mouth piece 27 at the peripheral face thereof a flange part 29 is provided, so as to extend in the radially outward direction. The mouth piece 27 is fixed by the engagement of the flange part 29 and the outer face of the reinforce layer 24.

At the thread hole 28 of the mouth piece 27, a plug 30 having a gas-barrier function. The plug 30 includes: a thread part 31 which has a screw thread on the peripheral face thereof, and which engages with the thread hole 28 of the mouth piece 27; and a head part 32 formed at one end of the thread part 31, and having a diameter larger than that of the outer diameter of the thread part 31. The plug 30 is removable and from the mouth piece 27 as needed and re-attachable thereto, e.g., when the tank body 20 receives maintenance or the like. A seal member 33, e.g., an o-ring, is provided between the head part 32 of the plug 30 and the flange part 29 of the mouth piece 27, so as to seal the gap between the plug 30 and the mouth piece 27.

An intake-exhaust pipe 34 which supplies the hydrogen gas into the gas storage tank 25, and exhausts the hydrogen gas from inside of the gas storage tank 25 and supplies the hydrogen gas into a fuel gas line 40 (see FIG. 2) of the fuel cell vehicle 1. The intake-exhaust pipe 34 extrudes into the gas storage tank 25, with the tip thereof pointing toward the head plate part 22*b*. On the other hand, the base end side of the intake-exhaust pipe 34, is connected to the fuel gas line 40 (see FIG. 2).

A pressure sensor 35, which detects the internal pressure of the gas storage tank 25, is also connected to the plug 30.

On the other hand, at a center part (berry button part; top of the half-spherical shape of the head plate part 22*b*) of the head plate part 22*b*, a supersonic wave sensor 37 is provided. This supersonic wave sensor 37 detects sonic wave propagated through the liner 23, and is provided directly on the peripheral face of the liner 23.

A diagnostic circuit (internal abnormality determination member) 38 is connected to the supersonic wave sensor 37. This diagnostic circuit 38 receives a pressure signal representing the internal pressure of the gas storage tank 25, detected by the pressure sensor 35; and also receives a detection signal representing the sonic wave status detected by the supersonic wave sensor 37; and based on these signals, determines whether the liner 23 has an internal abnormality such as a crack or the like. The diagnostic circuit 38 includes a storage member (such as a memory) which stores the relationship (correlation) information between the internal pressure of the gas storage tank 25 in a normal status (in which no internal abnormality exists), and the sonic wave propagating in the liner 23 and in the reinforce layer 24 at such internal pressure value. The diagnostic circuit 38 also stores, at any required time point, the internal pressure at the time, of the gas storage tank 25 detected by the pressure sensor 35, and the sonic wave detected by the supersonic wave sensor 37 at such internal pressure.

An internal abnormality determination member 39 (ECU) is also connected to the diagnostic circuit 38. This ECU 39 performs the general electrical control of the fuel cell vehicle 1. Based on the determination of the diagnostic circuit 38, if an abnormality is detected in the liner 23, the ECU 39 outputs an fuel charging operation halt signal to a fuel charging station (not shown in the figure). A notification member (nor shown in the figure) is connected to the ECU 39, and based on the determination of the diagnostic circuit 38, if an abnormality is detected in the liner 23, outputs an alarm signal to the notification member. Upon receiving the alarm signal, the notification member is constituted to send an alarm to the operator.

(Detection Method of Internal Abnormality of Fuel Gas Tank)

The detection method of internal abnormality of the fuel gas tank 9 is explained below. In the present embodiment, the internal abnormality is detected by so-called acoustic emission method (AE method). In the following explanation, an example situation is used in which a part of the liner 23 has a crack (see reference symbol C in FIG. 3) during the charging of the hydrogen gas, and the method is applied to detect such crack.

As shown in FIG. 3, when the hydrogen gas is charged into the gas storage tank 25 of the tank body 20 through the intake-exhaust pipe 34, the internal pressure of the gas storage tank 25 rises to at most about 35 MPa. The pressure sensor 35 continuously detects the change of the internal pressure of the gas storage tank 25, and outputs the detection results to the diagnostic circuit 38 as a pressure signal (pressure detection process).

When the internal pressure of the gas storage tank 25 rises, the stress acts on the internal face of the liner 23, and this stress causes a sonic wave in the liner 23. This sonic wave propagates in the liner 23 and the reinforce layer 24, as illustrated by the arrow A in FIG. 3, and detected by the supersonic wave sensor 37. The detection result of the sonic wave detected by the supersonic wave sensor 37 is output to the diagnostic circuit 38 as a detection signal (sonic wave detection process).

When the internal pressure of the gas storage tank 25 rises, the stress concentrates at the occurrence position of the crack C in the liner 23. This stress causes further deformation and progression of the crack C. Along with the deformation and progression of the crack C, a considerable amount of elastic sonic wave (so called crack noise) is emitted from the position of crack C. The crack noise emitted from the position of is propagated in the liner 23 and the reinforce layer 24, and detected by the supersonic wave sensor 37. The supersonic wave sensor 37 outputs the detected crack noise to the diagnostic circuit 38 as a crack noise detection signal.

The diagnostic circuit 38 receives the pressure signal outputted from the pressure sensor 35, the sonic wave detection signal outputted from the supersonic wave sensor 37, and the crack noise detection signal, and stores them in the storage member.

The diagnostic circuit 38 then performs a noise cancellation, and determines whether the crack noise obtained from the crack noise detection signal is derived from a background noise, or is derived from an occurrence of a crack (noise cancellation process). Specifically, the diagnostic circuit 38 calculates the sonic wave in a normal status of the liner 23, which corresponds to the pressure level detected by the pressure sensor 35 at the time of crack noise occurrence, using the data stored in the storage member. The diagnostic circuit 38 then calculates the difference between the actual detected value of the sonic wave at the time of crack noise occurrence, and the normal-state sonic wave stored in the storage member in advance. Through this procedure, the increase of the sonic wave at the position of the crack C can be calculated.

Then, when the calculation result was lower than a predetermined threshold value (denoted crack threshold, hereinafter), the diagnostic circuit 38 determines that obtained the crack noise is derived from a background noise. On the other hand, when the calculation result was larger than the crack threshold, it determines that a crack C exists in the liner 23 (internal abnormality determination process). Thereafter, if an existence of the crack was determined, the diagnostic circuit 38 outputs a crack occurrence signal to the to the ECU 39.

The ECU 39, when it received the crack occurrence signal, outputs a fuel charging operation halt signal to the fuel charging station, and outputs a alarm signal to the notification member, which reports the occurrence of the crack C to the operator (abnormality signal output process; control signal output process). The fuel charge station, upon receiving the fuel charge operation halt signal, halts the fuel gas charge. At the same time, the notification member which received the alarm signal emits an alarm to the operator. Thereby, the operator can promptly notice the occurrence of the crack C.

As explained above, the present embodiment is constituted such that, during the hydrogen gas charge into the liner 23, using the sonic wave detected by the supersonic wave sensor 37, the occurrence of a crack C in the liner 23 can be determined, and when a crack C in the liner 23 occurred, an abnormality signal is outputted.

According to this constitution, when hydrogen gas is charged into the liner 23, the internal pressure of the gas storage tank 25 rises. This pressure rise causes an outward stress on the inside surface of the liner 23, in the direction of expanding the liner 23.

At this time, if an internal abnormality such as a crack or the like existed in the liner 23, by the effect of the pressure rise in the gas storage tank 25, the stress concentrates at the position of the crack C. This concentrated stress causes a deformation or a progression of the crack C. Then, along with the deformation or the progression of the crack C, a crack noise emerges at the position of the crack C. When this crack noise is detected by the supersonic wave sensor 37, based on the actual detection value detected by the supersonic wave sensor 37 and the information of normal status sonic wave stored in the diagnostic circuit 38, the occurrence of the crack C can be reliably and quickly determined. Thereby, the crack C in the liner 23 covered by the reinforce layer 24 can be determined without a visual examination. After the occurrence of the crack C is determined, by outputting a control signal to the fuel charge station and the notification member, it is possible to restrict the charging operation before a progression of the crack C into a larger crack which may cause the hydrogen leak from the liner 23.

Furthermore, the diagnostic circuit 38 includes the storage member which stores the relationship information between the internal pressure of the gas storage tank 25 in a status where the crack C does not exist in the liner 23, and the sonic wave which propagates in the liner 23 at the pressure. Therefore, by comparing the stored sonic wave in the storage member and the actual detected value of the sonic wave by the supersonic wave sensor 37, it is possible to perform the noise cancellation of the detected value. When, even after the noise cancellation, if the sonic wave still remained, then it can be determined that a crack C exists. Accordingly, even a minor crack noise can be detected, and the crack C of the liner 23 can be precisely and quickly detected.

Furthermore, when the crack C occurred in the liner 23, by outputting a fuel charge operation halt signal to the fuel charge station, it is possible to halt the hydrogen gas charge into the gas storage tank 25. Accordingly, a safe charge operation can be performed.

At the same time, when a crack C occurred in the liner 23, by notifying the occurrence of the crack C to the operator, the operator can promptly notice the occurrence of the crack C. Accordingly, the operator can take appropriate steps to prevent a hydrogen gas leak from the liner 23.

As explained above, when the fuel gas tank 9 of the present embodiment is applied to the high pressure hydrogen tank provided on the fuel cell vehicle 1, a crack C in liner 23 can be continuously detected while the fuel gas tank 9 is loaded in the vehicle body. Accordingly, unlike the there is no need to remove the fuel gas tank 9 from the vehicle, in order to inspect crack C, resulting in an decrease in a man-hour for the maintenance and a cost thereof.

Since the crack C of the liner 23 can be detected while the fuel gas tank 9 is loaded in the vehicle, it is possible to detect the crack C of the liner 23 before it further deforms and progresses. Accordingly, a maintenance operation can be performed safely, resulting in an improved safety.

Second Embodiment

Fuel Gas Tank

Figure 4:
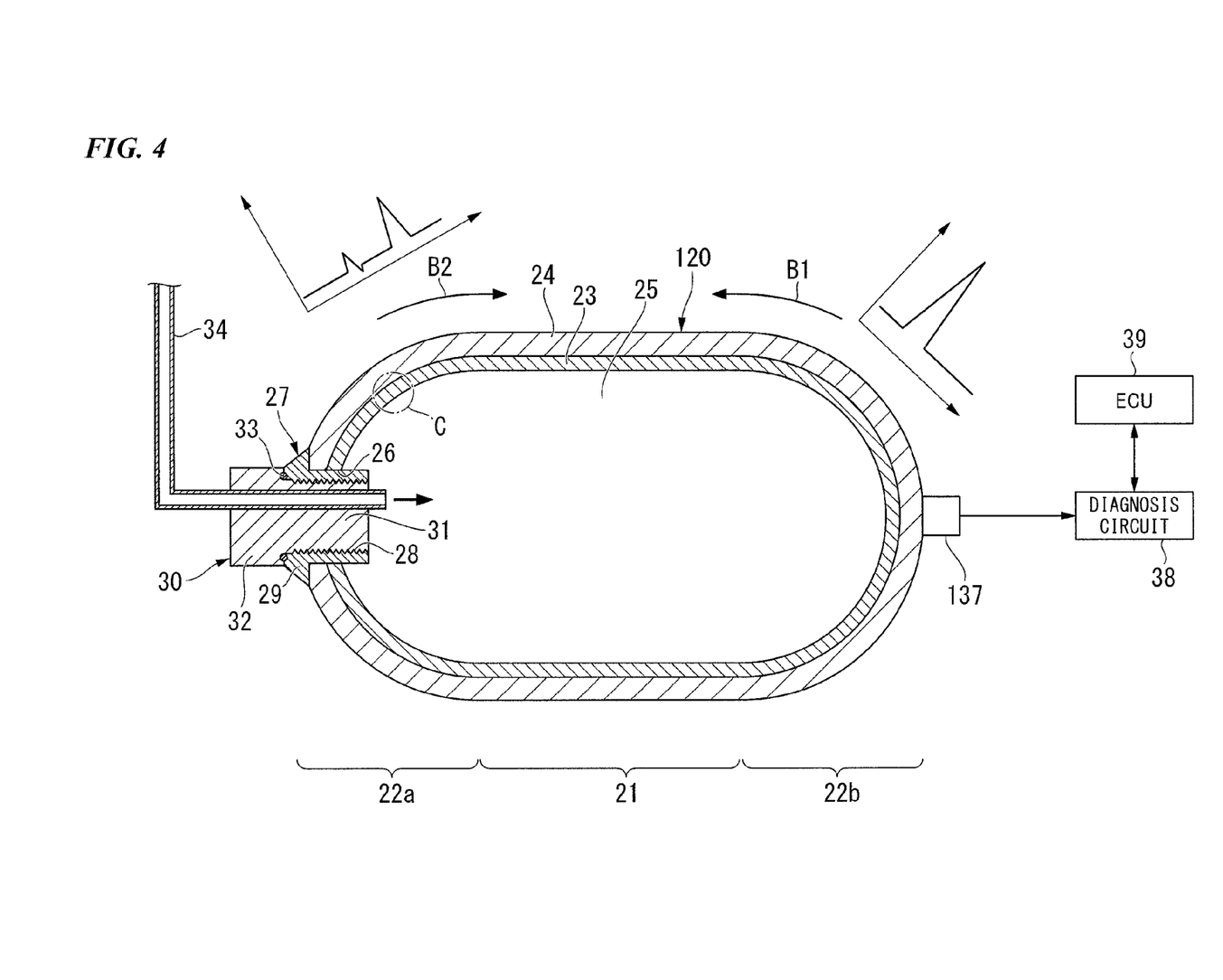
FIG. 4 is a sectional view of a fuel gas tank according a second embodiment of the present invention.

A second embodiment is explained below. FIG. 4 is a sectional view of a fuel gas tank according the second embodiment of the present invention. In the following explanation, constitutions corresponding to the aforementioned first embodiment are shown with the same reference symbols, and omitted from the explanation.

As shown in FIG. 4, the fuel gas tank 120 of the present embodiment is provided with a supersonic wave probe 137 in the center part of the head plate part 22. This supersonic wave probe 137 includes a Piezoelectric element, and emits a sonic wave into the liner 23, and receives the echo (reflected sonic wave) thereof (the arrow B1 in FIG. 4). In other words, the supersonic wave probe 137 has both functions of a sonic wave emitter and a sonic wave receiver. The sonic wave frequency emitted from the supersonic wave probe 137 is preferably selected so that the sonic wave is not interfered by noises such as the nose caused from the vibration of the fuel cell vehicle 1 or the like, and that a crack C in the tank body 20 can be detected by the sonic wave of such frequency. In particular, a frequency of equal to higher than 10 kHz to 10 MHz is preferable.

The storage member of the diagnostic circuit 38 according to the present embodiment stores the relationship information between the input sonic wave and the echo thereof for the normal status of the liner 23.

(Internal Abnormality Detection Method of the Fuel Gas Tank)

An internal abnormality detection method according to the second embodiment is explained below, with reference to the flowchart of FIG. 5. The internal abnormality detection of the present embodiment adopts so called sonar method. In the following explanation, an instance is explained wherein the internal abnormality detection is performed in the period from the turn-on of the ignition (IG on) of the fuel cell vehicle 1 until the departure (start) of the fuel cell vehicle 1.

Figure 5:
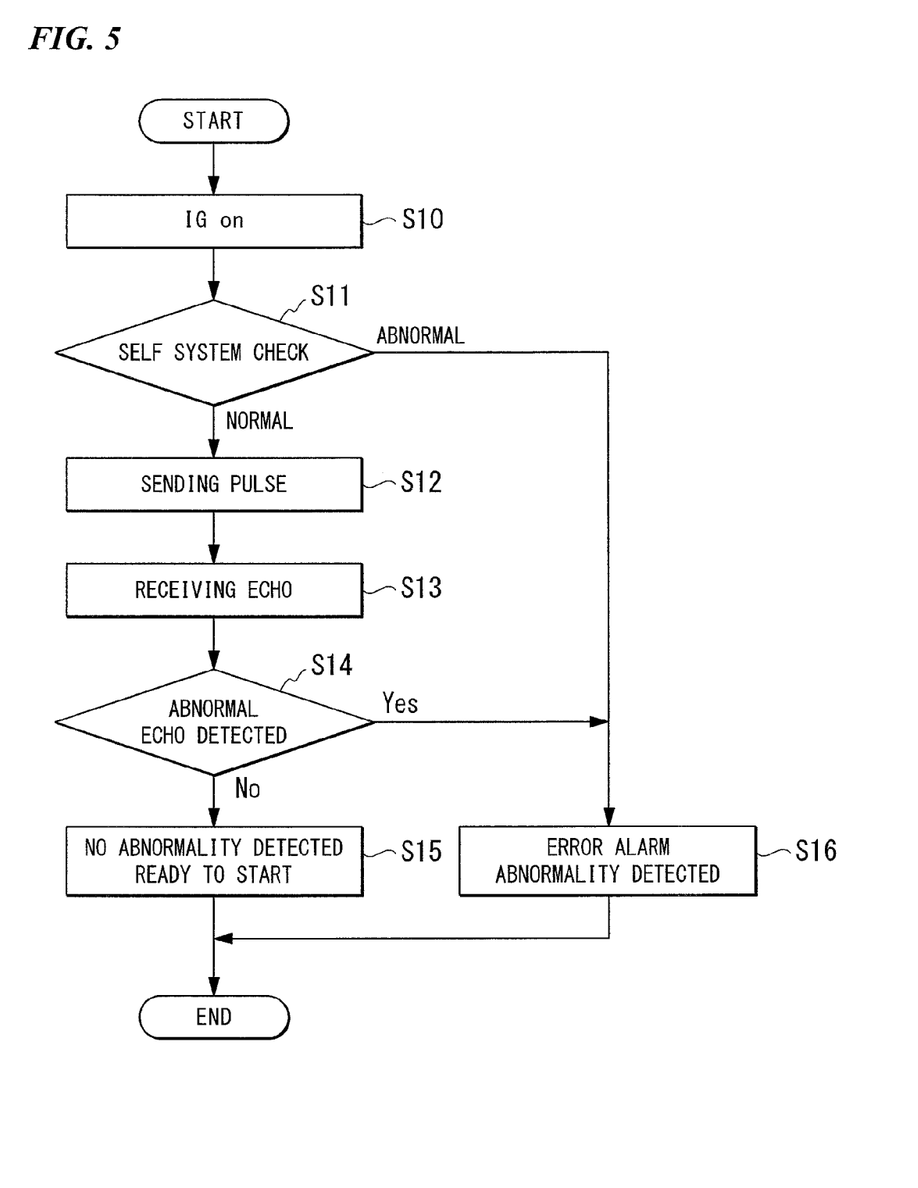
FIG. 5 is a flowchart showing a detection method of fuel gas tank internal abnormality according to the second embodiment.

As shown in FIG. 5, firstly, in the process S10, the ignition of the fuel cell vehicle 1 is turned on. Then the procedure proceeds to process S11.

Next, in process S11, a self system check is performed, in order to detect relatively large crack C. The self system check determines whether an abnormality such as leak from tank body 20 is occurring.

If the determination result was 'Normal', then the process determines that no leak was detected by the self system check, and the procedure proceeds to process S12. If the determination result in process S11 was 'Abnormal', then the procedure determines that a leak is detected by the self system check, and proceeds to process S16.

Next, in process S12, the supersonic wave probe 137 emits a sonic wave to the liner 23 (sonic wave emission process). The sonic wave propagates in the liner 23 and the reinforce layer 24, and then returns to the supersonic wave probe 137 as an echo.

Then, in process S13, the status (e.g., the amplitude) of the echo is detected by the supersonic wave probe 137. The detection result is outputted to the diagnostic circuit 38 as a detection signal (echo reception process).

In process S14, the diagnostic circuit 38 receives the echo detection signal, and based on this detection signal, determines whether this echo is abnormal or not (noise cancellation process).

Part (a), (b), and (c) of FIG. 6A are graphs showing the wave amplitudes at various time t. Part (a) shows a normal status; Part (b) shows a crack occurrence status; and Part (c) shows an amplitude caused by the crack.

Figure 6:
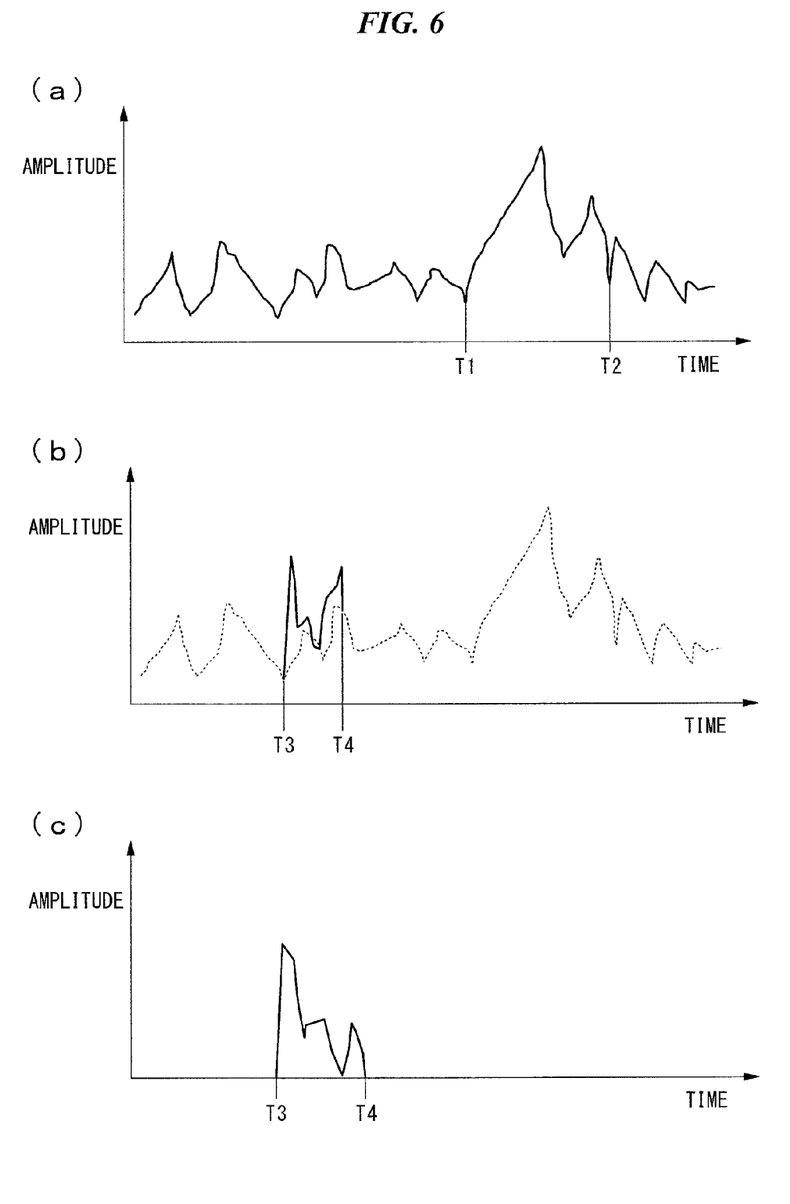

When the echo status was normal (crack C does not exist in liner 23), as shown in Part (a) of FIG. 6, in the region of time except for the region from T1 to T2, the echo amplitude resides within approximately constant range, resulting from the detection of the echo reflected from the liner 23. In other words, for the echo reflected in the liner 23 (the cylinder part 21 and the head plate part 22a,22b), since the thickness and the like of the liner 23 is essentially constant in this instance, the sonic wave in the liner 23 is propagated at an essentially constant amplitude. On the other hand, in the time region from time point T1 to time point T2, the echo amplitude is higher. In this time region the echo primarily represents the reflection from the mouth piece 27. Since the mouth piece 27 includes a material different from the liner 23, and also have more complicated structure, the echo amplitude propagated in the mouth piece 27 becomes larger than the echo amplitude propagated in the liner 23.

On the other hand, as shown in Part (b) of FIG. 6, when a crack C emerged between the time point T3 and T3, the sonic wave amplitude propagated in the position of the crack C becomes larger than the sonic wave amplitude propagated in the liner in a normal status (shown as a broken line in Part (b) of FIG. 6).

In the present embodiment, the diagnostic circuit 38 calculates the difference between the sonic wave amplitude (actual detected value) during the crack occurrence, and the sonic wave amplitude in a normal status stored in the storage member. Based on this calculation result, as shown in Part (c) of FIG. 6, the amplitude difference, i.e., the increase caused at the position of the crack C can be obtained. When the calculation result was lower than the crack threshold, the procedure determines that the echo is normal ("NO"), and the procedure proceeds to process S15. On the other hand, when the calculation result is higher than the crack threshold, then the procedure determines that the echo is abnormal ("YES"), and proceeds to process S16.

Then, if the determination result in process S14 was "NO", in process S15, the procedure determines that the liner 23 has no abnormality of crack C or the like, and the fuel cell vehicle 1 starts.

On the other hand, if the determination result was "YES", in process S16, the diagnostic circuit 38 outputs a crack occurrence signal to the ECU 39. Then, as in the aforementioned first embodiment, the procedure outputs a fuel charge operation halt signal to the fuel charge station, and outputs an alarm signal to the notification member, notifying the occurrence of the crack C to the operator (control signal output process).

Thereafter, the procedure of the internal abnormality detection according to the present embodiment ends.

As explained above, in the present embodiment, the sonic wave emitted from the supersonic wave probe 137 into the liner 23 is reflected in the liner 23 and returns to the supersonic wave probe 137. The sonic wave status of the returned echo is compared with the sonic wave status propagated in the liner 23 in a normal status. Thereby, if there is an abnormality in the sonic wave status, it can be determined that the liner 23 may have a crack C. Moreover, by performing a noise cancellation using the sonic wave status in a normal status, the occurrence of the crack C can be reliably detected.

Accordingly, the same advantageous effect and other advantages can be obtained.

In the present embodiment, the supersonic wave probe 137 and the mouth piece 27 are provided at a center part of the head plate part 22a, 22b, the mouth piece 27 and the supersonic wave probe 137 are positioned at essentially symmetric positions. Therefore, the emitted sonic wave pattern and the resulting echo sonic wave pattern are essentially in the same shape. Accordingly, by specifying the time region in the echo wave of the peak derived from the reflection from the mouth piece 27, it can be deduced that the time for the echo to propagate from the head plate part 22a to the head plate part 22b is time point T1 to time point T2. From such information, the position of echo source can be approximately deduced. Therefore, the position of the crack C can be specified without a visual examination, and thereby the maintenance efficiency can be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the aforementioned embodiments, the internal abnormality detection was performed, either during the hydrogen gas charging in the first embodiment, or when the ignition of the fuel cell vehicle was turned on in the second embodiment. However, the internal abnormality detection can be performed at any appropriate time. For example, the detection can be performed in a periodical manner with a predetermined interval.

The invention claimed is:

1. A pressure tank comprising,
a tank wall;
a supporting member which includes fiber reinforced plastic and supports an outer surface of the tank wall;
a supersonic wave sensor which is connected to the tank wall, and which detects a sonic wave propagated in the tank wall; and
an internal abnormality determination member which is connected to the supersonic wave sensor, and which determines whether an internal abnormality exits in the tank wall, wherein the internal abnormality determination member determines the existence of the internal abnormality based on the detection result during gas is charged into the pressure tank, and outputs an abnormality signal when the internal abnormality was determined to exist.

2. The pressure tank according to claim 1, wherein
the supersonic wave sensor includes a pressure sensor which detects an internal pressure of the pressure tank; and
a storage member which stores the relationship information between
the internal pressure of the pressure tank in a status having no internal abnormality, and
a sonic wave shape propagated in the tank wall at the internal pressure, wherein:
the internal abnormality determination member performs a noise cancellation, by comparing the sonic wave shape stored in the
storage member corresponding to the internal pressure detected by the pressure sensor, and the sonic wave shape detected by the supersonic wave sensor; and
the internal abnormality determination member determines whether an internal abnormality exists, based on the sonic wave shape after the noise cancellation.

3. The pressure tank according to claim 1, wherein
the pressure tank is loaded on a fuel cell vehicle in the interior thereof, and supplies gas fuel to fuel cells of the fuel cell vehicle.

4. The pressure tank according to claim 3, wherein
the abnormality signal is outputted to a fuel charge station and cause the fuel charge station to holt a fuel charge operation.

5. The pressure tank according to claim 3, further comprising a notification member which notifies an occurrence of the internal abnormality to an operator, when the internal abnormality of the tank wall is determined by the internal abnormality determination member.

6. A pressure tank comprising:
a tank wall provided with a supporting member including fiber reinforced plastic at a outer surface of the tank wall;
a supersonic wave probe provided on the tank wall, which emits a sonic wave into the tank wall, and receives a reflection sonic wave of the emitted sonic wave; and
an internal abnormality determination member which determines the status of an internal abnormality in the tank wall, based on the reflection sonic wave received by the supersonic wave probe, wherein:
the internal abnormality determination member performs a noise cancellation, by comparing the reflection sonic wave received by the supersonic wave probe, and a sonic wave stored in advance in a status where no internal abnormality exists; and
the internal abnormality determination member determines a status of the internal abnormality, based on a status of the reflection sonic wave after the noise cancellation,
wherein the sonic wave stored in advance comprises a plurality of amplitude and corresponding time values.

7. The pressure tank according to claim 6, wherein:
the pressure tank is loaded on a fuel cell vehicle in the interior thereof, and supplies gas fuel to fuel cells of the fuel cell vehicle;
the internal abnormality determination member determines a status of the internal abnormality in a period from a turn-on of an ignition of the fuel cell vehicle until a start of the fuel cell vehicle;
when the internal abnormality determination member determined that there is no internal abnormality, the internal abnormality determination member allows the start of the fuel cell vehicle; and
when the internal abnormality determination member determined that there is an internal abnormality, the internal abnormality determination member notifies an operator of the fuel cell vehicle with the occurrence of the internal abnormality.

8. The pressure tank according to claim 6, further comprising:
a first head plate which is provided at a first end along an axial direction of the pressure tank, and which has a mouth piece at a center part of the first head plate; and
a second head plate which is provided at a second end along an axial direction of the pressure tank, and which has a supersonic wave probe at a center part of the second head plate.

9. An internal abnormality detection method of a pressure tank, the pressure tank having a tank wall and a supporting member at an outer surface of the tank wall, the supporting member including fiber reinforced plastic, the method comprising:
a sonic wave detection process which detects a sonic wave that propagates in the tank wall accompanied with an internal pressure rise in the tank wall;
an internal abnormality determination process which determines whether an internal abnormality of the tank wall exists or not; and
an abnormality signal output process, in which, when the internal abnormality determination process determined that an internal abnormality exists in the tank wall, an abnormality signal is outputted, wherein:
the internal abnormality determination process includes a noise cancellation process, which performs a noise cancellation by comparing a sonic wave status detected in the sonic wave detection process and a sonic wave status propagated in the tank wall in a state in which no internal abnormality exists in the tank wall; and
the internal abnormality determination process uses the sonic wave status after the noise cancellation, in order to determine the internal abnormality in the tank wall.

10. An internal abnormality detection method of a pressure tank, the pressure tank having a tank wall and a supporting member at an outer surface of the tank wall, the supporting member including fiber reinforced plastic, the method comprising:
a sonic wave emission process which emits a sonic wave into the tank wall;
an echo reception process which receives a reflection sonic wave of the sonic wave emitted in the sonic wave emission process;
an internal abnormality determination process which determines the status of an internal abnormality of the tank wall; and
an abnormality signal output process, in which, when the internal abnormality determination process determined that an internal abnormality exists in the tank wall, an abnormality signal is outputted, wherein:
the internal abnormality determination process includes a noise cancellation process, which performs a noise cancellation by comparing the reflection sonic wave detected in the echo reception process and a sonic wave propagated in the tank wall in a state in which no internal abnormality exists in the tank wall; and the internal abnormality determination process uses the sonic wave status after the noise cancellation, in order to determine the internal abnormality in the tank wall, wherein the sonic wave propagated in a tank in a state in which no internal abnormality exists comprises a plurality of amplitude and corresponding time values.

11. The internal abnormality detection method according to claim 10, wherein the internal abnormality determination process determines a status of the internal abnormality in a period from a turn-on of an ignition of the fuel cell vehicle until a start of the fuel cell vehicle;

when the internal abnormality determination process determined that there is no internal abnormality, the internal abnormality determination process allows the start of the fuel cell vehicle; and when the internal abnormality determination process determined that there is an internal abnormality, the internal abnormality determination process notifies an operator of the fuel cell vehicle with the occurrence of the internal abnormality.

* * * * *

UNITED STATES PATENT AND TRADEMARK OFFICE
CERTIFICATE OF CORRECTION

PATENT NO. : 8,264,337 B2  
APPLICATION NO. : 12/497028  
DATED : September 11, 2012  
INVENTOR(S) : Kiyoshi Handa Page 1 of 1

It is certified that error appears in the above-identified patent and that said Letters Patent is hereby corrected as shown below:

On the Title page, Item (22);
Change

"(22)   Filed:   September 15, 2009"

To be

--(22)   Filed:   July 2, 2009--

Signed and Sealed this
Seventh Day of May, 2013

Teresa Stanek Rea
*Acting Director of the United States Patent and Trademark Office*